(12) United States Patent
Klingbeil et al.

(10) Patent No.: US 10,557,430 B2
(45) Date of Patent: Feb. 11, 2020

(54) OIL CARRYOVER REDUCTION SYSTEM

(71) Applicant: General Electric Company, Schenectady, NY (US)

(72) Inventors: Adam Klingbeil, Ballston Lake, NY (US); Thomas Lavertu, Clifton Park, NY (US); Roy Primus, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 321 days.

(21) Appl. No.: 15/334,416

(22) Filed: Oct. 26, 2016

(65) Prior Publication Data

US 2018/0112611 A1     Apr. 26, 2018

(51) Int. Cl.
| | |
|---|---|
| *F02D 41/08* | (2006.01) |
| *F01M 11/10* | (2006.01) |
| *F02D 41/02* | (2006.01) |
| *F02D 21/08* | (2006.01) |
| *F02D 41/22* | (2006.01) |
| *F02D 41/00* | (2006.01) |
| *F01M 1/18* | (2006.01) |

(52) U.S. Cl.
CPC ............. *F02D 41/08* (2013.01); *F01M 1/18* (2013.01); *F01M 11/10* (2013.01); *F02D 21/08* (2013.01);
(Continued)

(58) Field of Classification Search
CPC ........ F02D 41/08; F02D 21/08; F02D 41/021; F02D 41/0235; F01M 1/18
(Continued)

(56) References Cited

U.S. PATENT DOCUMENTS

| | | |
|---|---|---|
| 8,473,127 B2 | 6/2013 | Daum et al. |
| 8,676,410 B2 | 3/2014 | Houpt et al. |

(Continued)

FOREIGN PATENT DOCUMENTS

AU     2012261786 A1     1/2013

OTHER PUBLICATIONS

Yang et al.; Design and Application of the Train Operation Optimization Systems of HXN5-Type locomotive; Proceedings of the 2015 International Conference on Electrical Information Technologies for Rail Transportation; Mar. 12, 2016; vol. 337; pp. 759-766.
(Continued)

*Primary Examiner* — Stephen K Cronin
*Assistant Examiner* — Omar Morales
(74) *Attorney, Agent, or Firm* — Philip S. Hof; The Small Patent Law Group, LLC (57) ABSTRACT

A system determines which propulsion-generating vehicle or vehicles in a group of propulsion-generating vehicles have an increased risk for oil carryover during operation at an idle setting for at least a designated oil carryover commencement time period. The system also determines a power requirement for the group of propulsion-generating vehicles in the vehicle system. The system determines power outputs for the propulsion-generating vehicles in the group such that the propulsion-generating vehicle or vehicles having the increased risk for oil carryover do not operate at an idle setting for longer than the designated oil carryover commencement period, and that the power generated by the group of propulsion-generating vehicles meets the power requirement that is determined.

20 Claims, 4 Drawing Sheets

(52) U.S. Cl.
CPC ....... *F02D 41/0047* (2013.01); *F02D 41/021* (2013.01); *F02D 41/0235* (2013.01); *F02D 41/22* (2013.01); *F01M 2250/60* (2013.01); *F02D 41/0065* (2013.01); *F02D 2200/702* (2013.01); *F02D 2250/08* (2013.01); *F02D 2250/18* (2013.01); *Y02T 10/47* (2013.01)

(58) Field of Classification Search
USPC ....................................................... 123/196 S
See application file for complete search history.

(56) References Cited

U.S. PATENT DOCUMENTS

| | | | | |
|---|---|---|---|---|
| 8,924,052 | B2* | 12/2014 | Melas | B61C 17/12 |
| | | | | 104/88.02 |
| 2007/0272116 | A1 | 11/2007 | Bartley et al. | |
| 2010/0174484 | A1 | 7/2010 | Sivasubramaniam et al. | |
| 2013/0131959 | A1* | 5/2013 | Shoda | F02D 41/0002 |
| | | | | 701/103 |
| 2014/0165967 | A1* | 6/2014 | Bucksey | F01B 7/08 |
| | | | | 123/46 A |
| 2014/0379180 | A1* | 12/2014 | Kral | B61C 7/04 |
| | | | | 701/19 |

OTHER PUBLICATIONS

Franke et al.; An algorithm for the optimal control of the driving trains; Decision and Control, 2000. Proceedings of the 39th IEEE Conference; vol. 3; pp. 2123-2128.

* cited by examiner

OIL CARRYOVER REDUCTION SYSTEM

FIELD

The subject matter described herein relates to systems and methods for reducing time periods in which vehicles operate under undesirable operating conditions to prevent or reduce oil carryover in engines of the vehicles.

BACKGROUND

Vehicles can be powered by operation of engines. These engines may consume fuel and having moving parts (e.g., pistons in cylinders) lubricated by oil. During operation of the engines in certain operational conditions (e.g., low fueling levels or during idle operation where an engine is operating but is not producing power to propel a vehicle), oil in cylinders of the engine may work upward and pool on top of pistons in the cylinders. At least some of this pooled oil may be expelled from the cylinders and/or engine via the flow of exhaust exiting the cylinders. The upward movement, pooling, and/or expulsion of the oil may be referred to as oil carryover.

Vehicles having systems that treat or re-use the exhaust from the cylinders may be damaged by oil carryover. For example, an exhaust aftertreatment system may chemically react one or more chemicals with the exhaust in order to reduce the amount of certain constituents in the exhaust. Exhaust gas recirculation (EGR) systems may recycle at least some of the exhaust and re-introduce the exhaust back into at least some of the cylinders in the engine.

But, the aftertreatment systems and EGR systems may be damaged by the presence of oil in the exhaust. Sulfur or other constituents in the exhaust due to oil carryover can damage or destroy chemical catalysts in the aftertreatment systems. Oil in the exhaust can damage or destroy cooling components of the EGR systems that are needed to cool the recirculated portion of the exhaust prior to re-introducing the exhaust back into the cylinders.

One existing attempt to prevent or reduce damage to aftertreatment systems and/or EGR systems from oil carryover includes temporarily increasing the load on the engine. This heats the exhaust and can burn the oil out of the exhaust. But, this solution also significantly increases the amount of fuel consumed by the engine and is not a fuel-efficient manner of reducing or eliminating oil carryover. This can help in removing, or blowing out, the oil pooled on top of the cylinders into the exhaust leaving the cylinders. But, this solution also increases the amount of oil in the exhaust for a temporary time period, which still can damage or destroy the catalysts in the aftertreatment systems and/or the cooling components of the EGR systems. Additionally, this solution can cause a significant amount of oil to be introduced into one or more cylinders of the engine. This oil cannot be easily compressed by the piston in a compression chamber of a cylinder. As a result, the engine may be damaged when a connecting rod of a cylinder attempts to compress the air (and oil) in the cylinder.

BRIEF DESCRIPTION

In one embodiment, a system includes a controller configured to determine which propulsion-generating vehicle or vehicles in a group of propulsion-generating vehicles have an increased risk for oil carryover during operation at an idle setting for at least a designated oil carryover commencement time period. The system also includes an energy management system configured to determine a power requirement for the group of propulsion-generating vehicles in the vehicle system. The controller is configured to determine power outputs for the propulsion-generating vehicles in the group such that the propulsion-generating vehicle or vehicles having the increased risk for oil carryover do not operate at an idle setting for longer than the designated oil carryover commencement period, and that the power generated by the group of propulsion-generating vehicles meets the power requirement that is determined.

In one embodiment, a method includes determining which propulsion-generating vehicle or vehicles in a group of propulsion-generating vehicles have an increased risk for oil carryover during operation at an idle setting for at least a designated oil carryover commencement time period, determining a power requirement for the group of propulsion-generating vehicles in the vehicle system, and determining power outputs for the propulsion-generating vehicles in the group such that power generated by the group of propulsion-generating vehicles meets the power requirement that is determined and the propulsion-generating vehicle or vehicles having the increased risk for oil carryover do not operate at the idle setting for at least the designated oil carryover commencement time period.

In one embodiment, a system includes a controller configured to determine which propulsion-generating vehicle or vehicles in a group of propulsion-generating vehicles have an increased risk for oil carryover during operation at an idle setting for at least a designated oil carryover commencement time period. The controller determines which of the propulsion-generating vehicle or vehicles in the group of propulsion-generating vehicles are at the increased risk by determining which propulsion-generating vehicle or vehicles in the group of propulsion-generating vehicles have one or more of an exhaust gas recirculation system or an exhaust gas aftertreatment system. The system also includes an energy management system configured to determine a power requirement for the group of propulsion-generating vehicles in the vehicle system. The controller is configured to determine power outputs for the propulsion-generating vehicles in the group such that power generated by the group of propulsion-generating vehicles meets the power requirement that is determined and the propulsion-generating vehicle or vehicles having the increased risk for oil carryover do not operate at the idle setting for at least the designated oil carryover commencement time period. The controller is configured to direct the propulsion-generating vehicles to operate at respective fueling levels that generate the respective power outputs.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
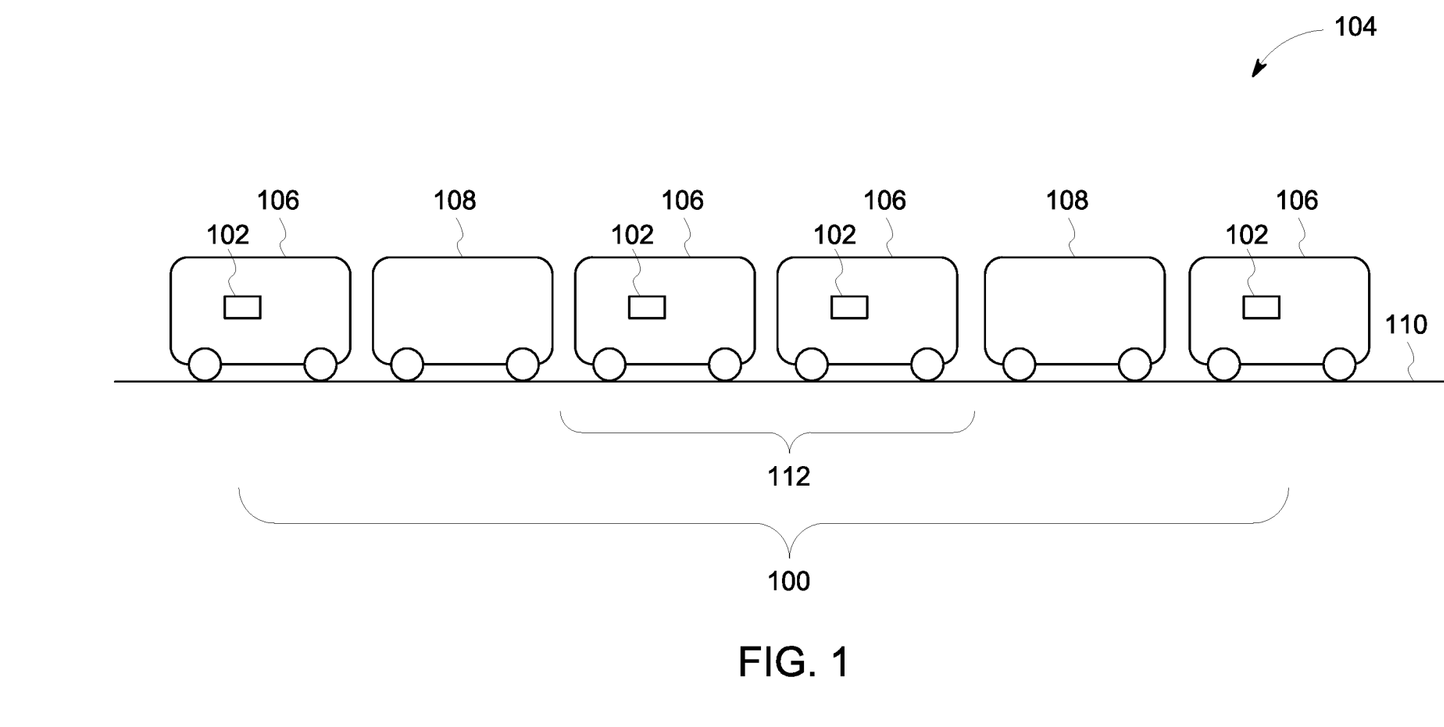
FIG. 1 illustrates one embodiment of a vehicle control system that reduces or eliminates time periods in which vehicles operate under undesirable operating conditions.

FIG. 1 illustrates one embodiment of a vehicle control system 100 that reduces or eliminates time periods in which vehicles operate under undesirable operating conditions. The system 100 includes one or more controllers 102 disposed onboard a vehicle system 104 that is formed from one or more vehicles 106, 108. While the vehicle system is shown as including several vehicles 106, 108, optionally, the vehicle system may include a single vehicle 106 or a different number of the vehicles 106 and/or the vehicles 108. The vehicles 106 are propulsion-generating vehicles having propulsion systems that operate to propel the vehicles 106. Examples of the propulsion-generating vehicles include rail vehicles (e.g., locomotives), automobiles, trucks, marine vessels, aerospace vehicles, mining vehicles, or other off-highway vehicles (e.g., vehicles that are not designed or are not legally permitted to travel on public roadways).

The vehicles 108 are non-propulsion-generating vehicles that do not have propulsion systems for propelling the vehicles 108. Examples of the non-propulsion-generating vehicles 108 include rail vehicles (e.g., rail cars), trailers, barges, or the like. The vehicles 106, 108 may be mechanically coupled with each other (e.g., by couplers), may abut one another during travel, or may be disconnected from each other but communicate with each other to coordinate their movements and, as a result, travel together as the vehicle system 104 along a route 110 (e.g., a track, road, waterway, or the like).

The vehicle system 104 can include one or more groups 112 of the vehicles 106. A group 112 of the vehicles 106 can include a single vehicle or two or more vehicles 106. In one embodiment, a group 112 of vehicles 106 is two or more adjacent or neighboring vehicles 106. Two or more vehicles 106 may be adjacent or neighboring when the vehicles 106 are directly coupled with each other (e.g., by couplers connected with each vehicle 106) and/or when the vehicles 106 are next to each other without any vehicles 108 between the adjacent or neighboring vehicles 106. A group 112 also may be referred to as a consist. While only a single group 112 is labeled in FIG. 1, optionally, a vehicle system 104 may have two or more groups 112.

Figure 2:
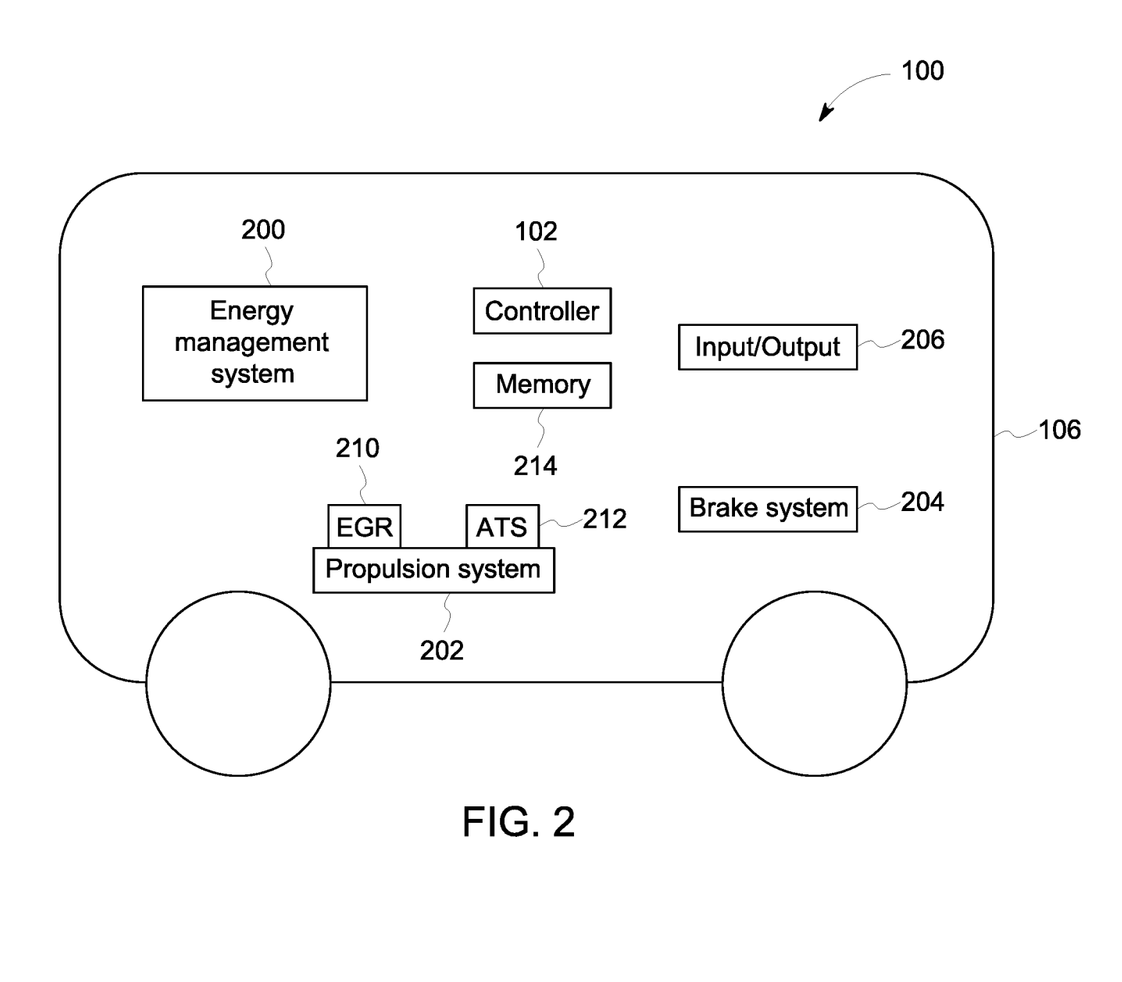
FIG. 2 illustrates one embodiment of the vehicle control system disposed onboard a propulsion-generating vehicle.

FIG. 2 illustrates one embodiment of the vehicle control system 100 disposed onboard one of the propulsion-generating vehicles 106. The vehicle control system 100 includes the controller 102 and an energy management system 200. The controller 102 represents hardware circuitry that includes and/or is connected with one or more processors (e.g., one or more microprocessors, field programmable gate arrays, and/or integrated circuits) that perform the operations described herein to reduce or eliminate time periods that the vehicle 106 operates in conditions that cause oil carryover or increase the amount of oil carryover.

The controller 102 communicates with a propulsion system 202 of the vehicle 106 via one or more wired and/or wireless connections. The propulsion system 202 represents one or more engines that consume fuel and that include a lubricating fluid (e.g., oil) for operation. The propulsion system 202 optionally can include one or more alternators, generators, motors, or the like, that operate based on movement of the engine. The controller 102 generates and sends control signals to the propulsion system 202 to control the speed at which the engine operates.

The controller 102 communicates with a brake system 204 of the vehicle 106 via one or more wired and/or wireless connections. The brake system 204 represents one or more brakes such as friction brakes, dynamic brakes, air brakes, or the like. The controller 102 generates and sends control signals to the brake system 204 to slow or stop movement of the vehicle 106.

The energy management system 200 represents hardware circuitry that includes and/or is connected with one or more processors (e.g., one or more microprocessors, field programmable gate arrays, and/or integrated circuits) that determine operational settings of the propulsion system 202 and/or the brake system 204 for different locations, times, and/or distances along one or more routes being traveled by the vehicle 106 and/or vehicle system 104 (shown in FIG. 1). The energy management system 200 can determine fueling levels, brake settings, speeds, or the like, at which the propulsion system 202, brake system 204, and/or vehicle 106 is to operate in order to reduce the amount of fuel consumed, reduce the amount of emissions generated, reduce the amount of noise generated, or the like, relative to the propulsion system 202, brake system 204, and/or vehicle 106 operating according to other operational settings (e.g., traveling at an upper speed limit of the routes 110 traveled by the vehicle 106). In one embodiment, the energy management system 200 may operate similar or identical to the trip planner or trip planner device and the operational settings designated by the energy management system 200 may be the trip plan created as described in U.S. Pat. No. 9,162,690, the entire disclosure of which is incorporated herein by reference.

The energy management system 200 can communicate the operational settings to the controller 102 and/or a memory 214 (described below), and the controller 102 may automatically control operation of the propulsion system 202 and/or brake system 204 to implement the operational settings, or optionally may communicate control signals to one or more input/output devices 206 to communicate the operational settings to an operator (who then controls the propulsion system 202 and/or brake system 204 accordingly). The input/output devices 208 can include one or more display devices, touchscreens, keypads, pedals, throttles, levers, etc.

In the illustrated embodiment, the propulsion system 202 is operably coupled with an exhaust gas recirculation system 210 (EGR in FIG. 2) and an aftertreatment system 212 (ATS in FIG. 2). Alternatively, the propulsion system 202 may be coupled with the exhaust gas recirculation system 210 and not the aftertreatment system 212, may be coupled with the aftertreatment system 212 but not the exhaust gas recirculation system 210, or may not be coupled with exhaust gas recirculation system 210 or the aftertreatment system 212.

The exhaust gas recirculation system 210 receives at least some exhaust expelled by cylinders of the engine in the propulsion system 202 and recirculates the received exhaust back into one or more cylinders of the engine in the propulsion system 202. The exhaust gas recirculation system 210 may cool the received exhaust and/or mix the received exhaust with air prior to circulating the exhaust back into the cylinders. The aftertreatment system 212 receives at least some exhaust expelled by cylinders of the engine and treats the received exhaust before directing the treated exhaust into the surrounding atmosphere. For example, the aftertreatment system 212 may chemically react the received exhaust with chemical catalysts to chemically alter the exhaust. This alteration can change the chemicals in the exhaust that are directed into the surrounding atmosphere. As described above, the exhaust gas recirculation system 210 and the aftertreatment system 212 may be damaged or destroyed by oil carryover in the exhaust exiting the engine of the propulsion system 202.

The memory 214 represents one or more computer-readable media, such as one or more computer hard drives, optical discs, flash drives, read only memories, and/or random access memories, that store data for use by the controller 102 and/or energy management system 200. The memory 214 can store data indicative of which vehicles 106 are included in the vehicle system 104, which vehicles 106 have one or more aftertreatment systems 212 and/or EGR systems 210, operational settings of the vehicles 106 as designated by the energy management system 200, or the like.

The control system 100 can vary operations of one or more vehicles 106 in the vehicle system 104 to prevent or reduce conditions that are prone to damaging the systems that receive the exhaust from the engine. For example, the control system 100 can reduce the amount of time that one or more of the vehicles 106 operate at fueling levels that are more likely to damage the aftertreatment system 212 and/or EGR system 210 than other fueling levels. This can involve reducing the amount of time that one or more of the vehicles 106 operates at an idle setting to prevent or reduce oil carryover (e.g., oil being introduced into the exhaust).

In one embodiment, the controller 102 determines which propulsion-generating vehicle 106 or vehicles 106 in a group of propulsion-generating vehicles 106 have an increased risk for oil carryover. The group of vehicles 106 may be all of the vehicles 106 in the vehicle system 104, or a subset of these vehicles 106. For example, the group may be a consist of vehicles 106 that are adjacent to each other (e.g., neighbor each other in the vehicle system 104 without being separated by one or more vehicles 104).

The controller 102 can make this determination by examining the data stored in the memory 214. The data may indicate which vehicles 106 have the aftertreatment system 212 and/or the EGR system 210. These vehicles 106 may have an increased risk for oil carryover when engines of the vehicles 106 operate at an idle setting for at least a designated oil carryover commencement time period. This time period may be a non-instantaneous duration of time, such as several minutes (e.g., fifteen minutes, ninety minutes, three hundred minutes, etc.). This time period may be determined by examining how long the vehicle 106 (or a vehicle 106 of the same make, model, and/or year of manufacture) can operate at an idle setting before at least a designated amount of oil (e.g., a measurable amount of oil) is present in the exhaust exiting the engine of the propulsion system 202 of the vehicle 106.

The oil carryover risk may be increased for these vehicles 106 relative to other vehicles 106 that do not have the aftertreatment system 212 or the EGR system 210. For example, not all of the vehicles 106 in the vehicle system 104 or in a consist of the vehicle system 104 may have this increased risk because one or more of the vehicles 106 may not include the aftertreatment system 212 and/or may not include the EGR system 210.

The controller 102 also determines a power requirement for one or more groups 112 of vehicles 106. The power requirement is a total amount of power that the vehicles 106 in a group 112 are to generate at one or more locations along the route 110. This power can be the total amount of tractive effort, propulsive force, torque, or electrical wattage that is to be generated by the propulsion systems 202 of the vehicle 106 or vehicles 106 in the group 112 at one or more locations along the route 110.

The controller 102 can determine the power requirement from information provided by the energy management system 200. The energy management system 200 can calculate the amount of power needed to be generated by the propulsion systems 202 of the vehicles 106 in a group 112 in order to propel the group 112 and/or the vehicle system 104 at different locations along the route 110. The amounts of power needed for different locations can be calculated based on the characteristics of the route 110 (e.g., curvature, grade, speed limit, etc.), characteristics of the vehicles 106 and/or vehicle system 104 (e.g., total mass, how much power each propulsion system 202 is capable of generating, etc.), characteristics of the external environment (e.g., wind speed, wind direction, coefficient of friction between the wheels of the vehicles 106 and the route 110, etc.), and/or characteristics of a trip of the vehicle system 104 (e.g., speeds at which the vehicle system 104 is to travel at the different locations, which may be designated by an operator and/or may be the speed limit of the route 110).

For example, for smaller radii of curvature in the route 110, steeper inclines in the route 110, heavier vehicles 106, faster wind speeds in a direction that is opposite or transverse to a direction of travel of the vehicle system 104, greater coefficients of friction between the wheels of the vehicles 106 and the route 110, and/or faster speeds at which the vehicle system 104 is to travel, the power requirement may be larger when compared to larger radii of curvature in the route 110, smaller inclines (or declines) in the route 110, lighter vehicles 106, slower wind speeds in the direction that is opposite or transverse to the direction of travel or wind speed in the direction of travel of the vehicle system 104, smaller coefficients of friction between the wheels of the vehicles 106 and the route 110, slower speeds at which the vehicle system 104 is to travel, etc. In one embodiment, the power requirements may be dictated (e.g., set) by an operator of the control system 100. Optionally, the power requirements may be obtained from previous trips of the same or different vehicle system 104 over the same route 110.

The controller 102 determines power outputs for the vehicles 106 in the group 112 for one or more locations along the route 110 based on the power requirements that are determined. The controller 102 may divide the power requirement to be generated by the vehicles 106 in the group 112 along a segment of the route 110 among the vehicles 106. For example, if three vehicles 106 are included in the group 112, then a power requirement may be divided by directing the propulsion system 202 of a first vehicle 106 to generate thirty percent of the power requirement, by directing the propulsion system 202 of a second vehicle 106 to generate fifty percent of the power requirement, and by directing the propulsion system 202 of a third vehicle 106 to generate twenty percent of the power requirement.

The controller 102 can divide the power requirement among the vehicles 106 in the group 112 such that the total power generated by the group 112 of vehicles 116 meets the power requirement that is determined without the vehicle 106 or vehicles 106 having the increased risk for oil carryover operate at a fueling level associated with the increased risk for at least the designated oil carryover commencement time period. This fueling level may be an idle setting in one embodiment. A fueling level may be an amount or rate of fuel supplied to one or more cylinders during a combustion cycle or during a longer time period. A fueling level of an idle setting may be the amount or rate of fuel supplied to an engine during a time period that the engine is operating at idle.

Figure 3:
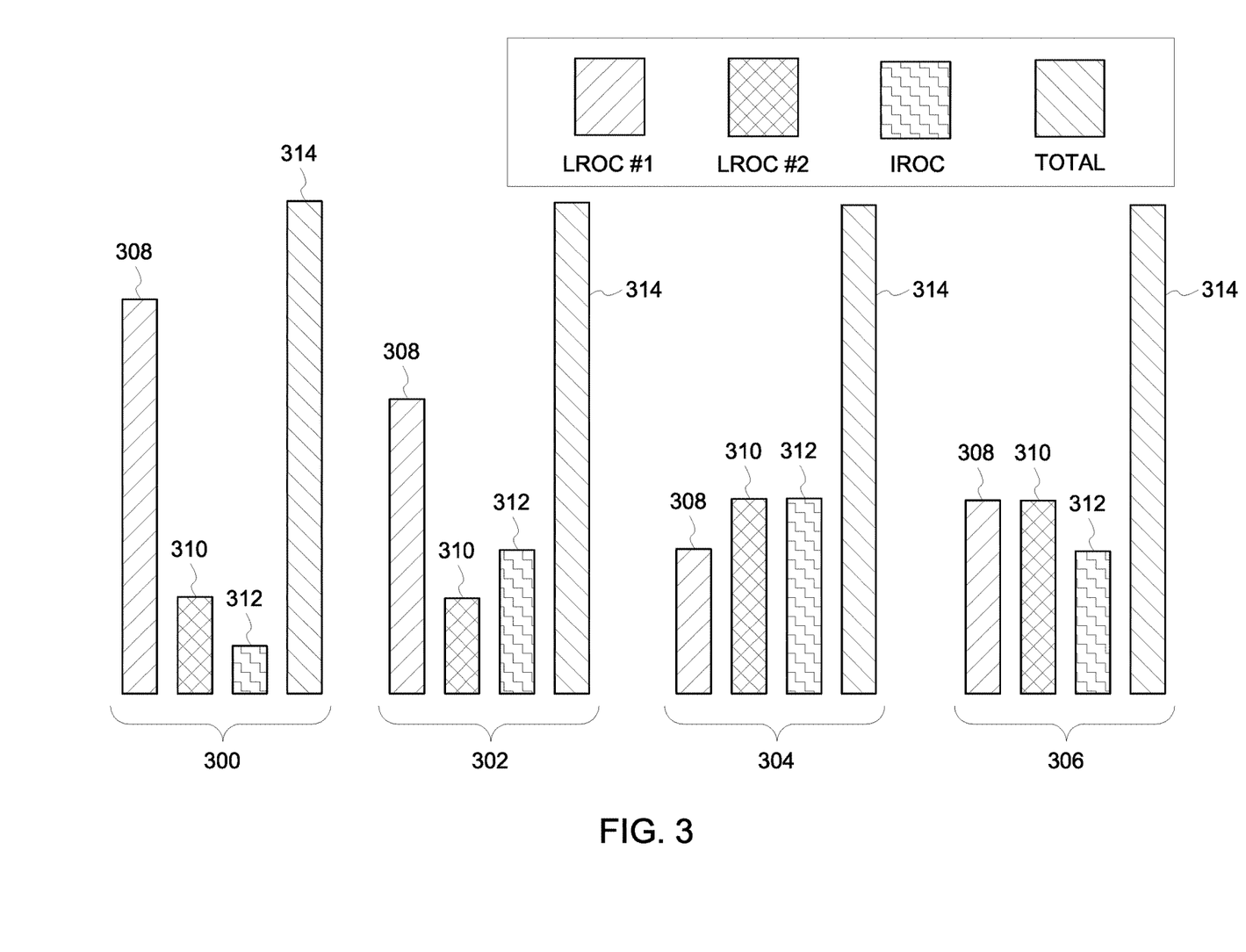
FIG. 3 illustrates examples of different sets of power outputs for propulsion-generating vehicles in a group of the vehicles in a vehicle system.

FIG. 3 illustrates examples of different sets 300, 302, 304, 306 of power outputs 308, 310, 312, 314 for the vehicles 106 in a group 112 of vehicles 106 in the vehicle system 100. Each set 300, 302, 304, 306 represents the power output 308, 310, 312, 314 for a group 112 of three vehicles 106 in the vehicle system 100. Although not shown in FIG. 1, the vehicle system 100 may have a group 112 of three (or a different number) of vehicles 106. The power outputs 308, 310, 312 represent amounts of tractive effort to be produced by different vehicles 106 in the group 112 and the power output 314 represents the power requirement for the vehicles 106 in the group 112.

For example, in each set 300, 302, 304, 306, the power output 308 can indicate the amount of power (or fueling level) for a first vehicle 106 in the group 112, the power output 310 can indicate the fueling level for a second vehicle 106 in the same group 112, the power output 312 can indicate the fueling level for a third vehicle 106 in the same group 112, and the power output 312 can indicate the power requirement for the group 112 at a designated location along the route 110. The power outputs 308, 310, 312 can indicate fueling level of the vehicles 106. For example, larger power outputs 308, 310, 312 are associated with larger fueling levels, while smaller power outputs 308, 310, 312 are associated with smaller fueling levels. The association of the fueling level with different power outputs may be stored in the memory 214.

The power outputs 308, 310, 312 in each set 300, 302, 304, 306 represent different potential power outputs or operational settings of the different vehicles 106. The power outputs 308, 310 can represent the power outputs or operational settings of first and second vehicles 106, respectively, having a lower risk of oil carryover ("LROC #1" and "LROC #2" in FIG. 3) relative to the third vehicle 106 (having a power output or operational setting represented by the power outputs 312). For example, the third vehicle 106 can include an aftertreatment system 212 and/or EGR system 210, while the first and second vehicles 106 do not include an aftertreatment system 212 or an EGR system 210. The third vehicle 106 can have an increased risk of oil carryover, as indicated by IROC in FIG. 3.

The sets 300, 302, 304, 306 are referred to as an initial set, a revised option A set, a revised option B set, and a revised option C set. The initial set 300 can represent the distribution of power outputs 308, 310, 312 among the vehicles 106 in the group 112 as directed by the energy management system 200. These power outputs can be based on fueling levels dictated by the energy management system 200 in order to reduce fuel consumed and/or emissions generated by the vehicle system 104. For example, larger fueling levels may be associated with greater power outputs relative to lower fueling levels.

The controller 102 examines the power outputs 308, 310, 312 of the initial set 300 and determines whether the power output 312 of the vehicle 106 having the increased risk of oil carryover will result in that vehicle 106 operating at a fueling level that is less than a designated threshold for at least the designated time period described above. For example, the controller 102 can examine the power outputs designated by the energy management system 200 for the vehicle 106 having the increased risk of oil carryover at different times to determine whether these power outputs result in that vehicle 106 operating at idle for at least the designated time period. If these power outputs would result in the vehicle 106 having the increased risk of oil carryover to operate at idle for at least the designated time period, then the controller 102 may alter the power outputs or operational settings designated by the energy management system 200.

The controller 102 may increase the power output or operational setting designated by the energy management system 200 to prevent the vehicle 106 having the increased risk of oil carryover from operating at idle for at least the designated time period. The controller 102 may re-distribute the total power requirement (e.g., 314) among the vehicles 106 in the group 112 to increase the power output or fueling level of the vehicle 106 having the increased risk of oil carryover. For example, the controller 102 may re-distribute the power requirement (e.g., 314) in the initial set 300 to the distribution of power outputs 308, 310, 312 in the revised option A set 302, to the distribution of power outputs 308, 310, 312 in the revised option B set 304, or to the distribution of power outputs 308, 310, 312 in the revised option C set 306. As shown in FIG. 3, the total power requirement 314 remains the same among all sets 300, 302, 304, 306, but the relative power outputs 308, 310, 312 of the vehicles 106 in the group 112 changes among the different sets 300, 302, 304, 306.

In one example, the controller 102 can increase the power output 312 of the increased risk vehicle 106 from the designated power output 312 determined by the energy management system 200 to the increased power output 312 shown in the first set 302. The controller 102 may then decrease the power output 308 and/or 310 designated for one or more of the lower or no risk vehicles 106 (e.g., the vehicles 106 having lower or no risks for oil carryover relative to the increased risk vehicle 106). For example, to compensate for the decreased power output 312 of the increased risk vehicle 106, the controller 102 may increase the power outputs 308, 312 of the lower or no risk vehicles 106, as shown in the set 302. The vehicles 106 in the group 112 may then operate at fueling levels associated with the power outputs 308, 310, 312 in the set 302 instead of the fueling levels associated with the power outputs 308, 310, 312 designated by the energy management system 200 in the set 300 to produce the same total power output or requirement 314.

In another example, the controller 102 can increase the power output 312 of the increased risk vehicle 106 from the designated power output 312 determined by the energy management system 200 to the increased power output 312 shown in the second set 304. The controller 102 may then decrease the power output 308 designated for one of the lower or no risk vehicles 106. For example, to compensate for the increased power output 312 of the increased risk vehicle 106, the controller 102 may decrease the power output 308 of the first lower or no risk vehicle 106, as shown in the set 304. The increase in the power output 312, however, may not be sufficient to compensate for (e.g., make up for) the decrease in the power output 308. Accordingly, the controller 102 also may increase the designated power output 310 to be provided by the second vehicle 106 having a lower or no risk for oil carryover, as shown in the set 304. The vehicles 106 in the group 112 may then operate at fuel levels associated with the power outputs 308, 310, 312 in the set 304 instead of the fueling levels associated with the power outputs 308, 310, 312 designated by the energy management system 200 in the set 300 to produce the same total power output or requirement 314.

In another example, the controller 102 can increase the power output 312 of the increased risk vehicle 106 from the designated power output 312 determined by the energy management system 200 to the increased power output 312 shown in the second set 306. The controller 102 may then decrease the power output 308 designated for one of the lower or no risk vehicles 106. For example, to compensate for the increased power output 312 of the increased risk vehicle 106, the controller 102 may decrease the power output 308 of the first lower or no risk vehicle 106, as shown in the set 304. The increase in the power output 312, however, may not be sufficient to compensate for (e.g., make up for) the decrease in the power output 308. Accordingly, the controller 102 also may increase the designated power output 310 to be provided by the second vehicle 106 having a lower or no risk for oil carryover, as shown in the set 306. The vehicles 106 in the group 112 may then operate at fueling levels associated with the power outputs 308, 310, 312 in the set 306 instead of the fueling levels associated with the power outputs 308, 310, 312 designated by the energy management system 200 in the set 300 to produce the same total power output or requirement 314.

Optionally, the energy management system 200 may not designate the fueling levels or power outputs 308, 310, 312 of individual vehicles 106, but may determine the total power output or requirement 314 of the group 112 of the vehicles 106 and/or of the entire vehicle system 104. For example, the energy management system 200 may determine how much total tractive effort or propulsive force (e.g., 314) is needed to propel the vehicle system 104 or group 112 of vehicles 106 over different segments of the route 110. These efforts or forces may be determined from previous trips of the vehicle system 104 or another vehicle system 104. The power requirement 314 that is determined can be communicated to the controller 102, which determines the fueling levels needed from the vehicles 106 to generate at least the power requirement 314. If these fueling levels would result in the vehicle or vehicles 106 having the increased risk for oil carryover operating at a fueling level (e.g., idle) associated with the increased risk for at least the oil carryover commencement time period, then the controller 102 can re-distribute, re-allocate, or otherwise divide up the total power requirement 314 among the vehicles 106 to prevent the vehicle or vehicles 106 having the increased risk for oil carryover from operating at the fueling level associated with the increased risk for at least the oil carryover commencement time period. In another example, the power requirement 314 may be determined from input provided by an operator of the vehicle system 104, such as input that specifies how much power the vehicles 106 are to provide, how fast the vehicles 106 are to travel, etc.

Figure 4:
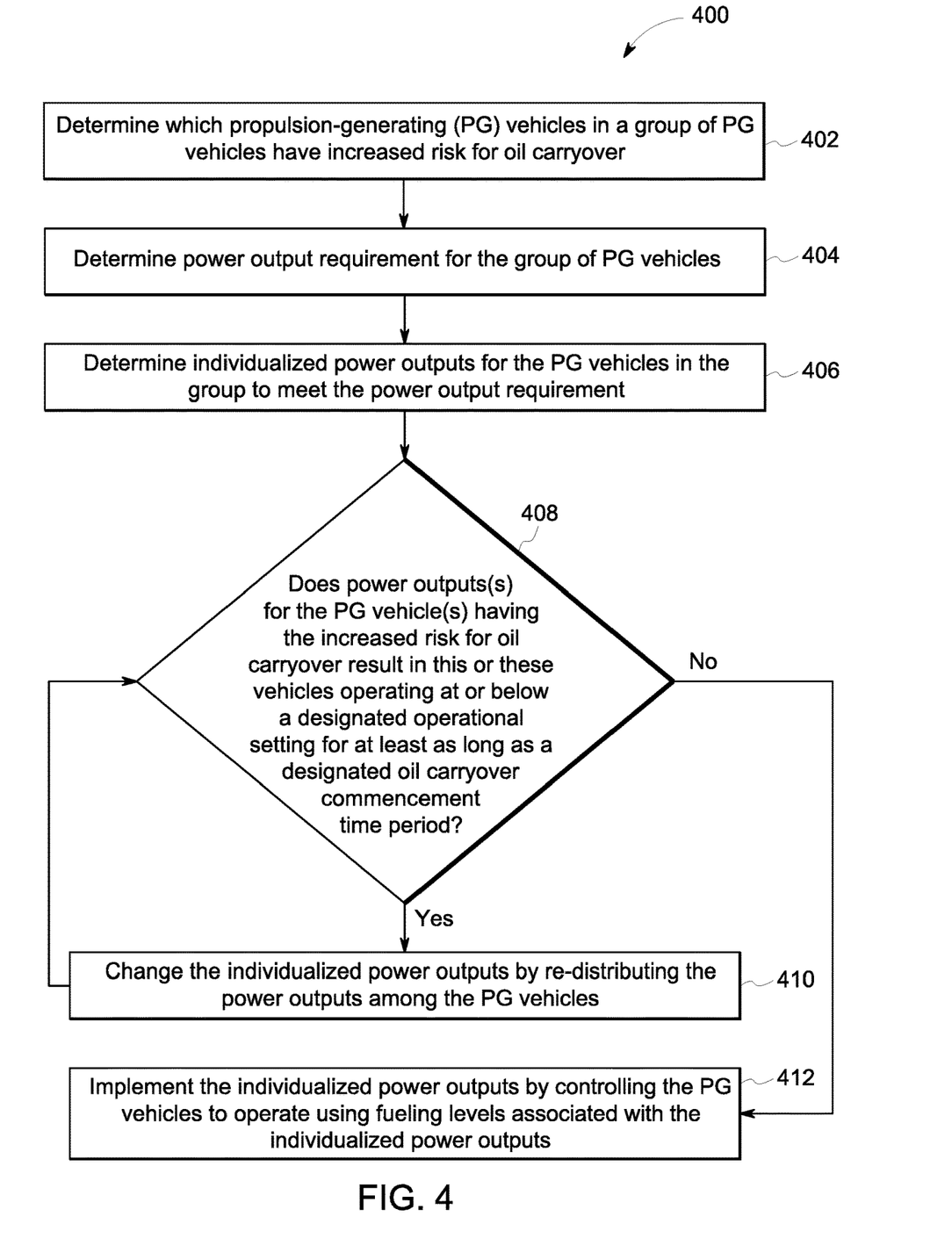
FIG. 4 illustrates a flowchart of one embodiment of a method for controlling a group of propulsion-generating vehicles.

FIG. 4 illustrates a flowchart of one embodiment of a method 400 for controlling a group of propulsion-generating vehicles. The method 400 may be used to determine the power outputs to be provided by and/or fueling levels used by propulsion-generating vehicles in the group or in a vehicle system to prevent or reduce the amount of oil carryover, and thereby protect exhaust-based systems (e.g., EGR systems and/or aftertreatment systems). The method 400 can represent a software application or applications directing at least some of the operations of the controller 102 and/or energy management system 200, or may represent an algorithm that can be used to create such a software application or applications.

At 402, a determination is made as to which propulsion-generating vehicles in a group of propulsion-generating vehicles have an increased risk of oil carryover. This determination may be made by examining the input provided by an operator of the control system 100 that identifies the vehicles 106 having exhaust-based systems, such as the EGR system 210 and/or the aftertreatment system 212. Alternatively, the memory 214 may store unique identifiers of the vehicles 106 with data indicating which vehicles 106 have the increased risk of oil carryover. The identifiers and data may be examined in order to determine which vehicles 106 have the increased risk of oil carryover.

At 404, a power output requirement for the group of the propulsion-generating vehicles is determined. This requirement may be the total power 314 needed to be generated by the vehicles 106 in the group 112 (or in the entire vehicle system 104) to propel the group 112 and/or vehicle system 104 over or through one or more segments of the route 110. The power requirement may be determined by the energy management system 200 (as described above) or may be designated by operational settings that are dictated by the energy management system 200.

At 406, individualized power outputs for the propulsion-generating vehicles in the group are determined in order to meet (or optionally exceed) the power output requirement of the group. Different portions of the total power requirement 314 may be distributed or allocated to different vehicles 106 in the group 112 such that the combined power outputs of the vehicles 106 in the group 112 meet (or optionally exceed) the power output requirement 314.

In one embodiment, the energy management system 200 determines the power output requirement 314 to reduce emissions generated and/or fuel consumed by the vehicles 106 relative to one or more other power requirements 314. The different portions of the total power requirement 314 may be distributed or allocated to different vehicles 106 in the group 112 such that the combined power outputs of the vehicles 106 in the group 112 meet, but do not exceed, the power output requirement 314. This can prevent the vehicles 106 from consuming more fuel or generating more emissions (relative to exceeding the power output requirement 314).

At 408, a determination is made as to whether the power output(s) for the propulsion-generating vehicle(s) having the increased risk for oil carryover results in the vehicle(s) operating at or below a designated operational setting for at least a designated oil carryover commencement time period. The individualized power outputs for the increased risk vehicles can be examined to determine whether implementation of these power outputs would result in the increased risk vehicles operating at an idle fueling level for at least the designated time period.

If implementation of the individualized power outputs would result in the increased risk vehicles operating at the idle fueling level for at least the designated time period, then flow of the method 400 can proceed toward 410. But, if implementation of the individualized power outputs would not result in the increased risk vehicles operating at the idle fueling level for at least the designated time period, then flow of the method 400 can proceed toward 412.

At 410, the individualized power output for the propulsion-generating vehicles in the group are changed by re-distributing the power outputs among the vehicles. For example, the power output for two or more of the vehicles may be changed so that the total power requirement of the group of vehicles is still provided by a combination of the vehicles, but with the power output of two or more of the vehicles being changed relative to the previously determined power outputs. Flow of the method 400 can then return toward 408 to determine if the re-distributed power outputs would result in the increased risk vehicles operating at the idle fueling level for at least the designated time period. This loop can continue until the distributed power outputs do not result in the increased risk vehicles operating at the idle fueling level for at least the designated time period.

At 412, the individualized power outputs are implemented by controlling the propulsion-generating vehicles to operate using the fueling levels associated with the individualized power outputs. The controller 102 can communicate signals to the propulsion systems 202 of the vehicles 106 to direct the propulsion systems 202 to operate using the fueling levels that cause the vehicles 106 to generate the respective individualized power output.

The method 400 may be repeated one or more additional times for different locations or time periods of a current or upcoming trip of the vehicle system 104 to ensure that the vehicles 106 having the increased risk for oil carryover do not operate at too low of a fueling level (e.g., idle) for too long of a time period that would result in oil carryover occurring and damaging the EGR system 210 and/or aftertreatment system 212.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a controller configured to determine which propulsion-generating vehicle or vehicles in a group of propulsion-generating vehicles have an increased risk for oil carryover during operation at an idle setting for at least a designated oil carryover commencement time period; and
   an energy management system configured to determine a power requirement for the group of propulsion-generating vehicles, wherein the controller is configured to determine respective power outputs for the propulsion-generating vehicles in the group such that the propulsion-generating vehicle or vehicles having the increased risk for oil carryover do not operate at the idle setting for longer than the designated oil carryover commencement time period, and that a combined power output generated by the group of propulsion-generating vehicles meets the power requirement that is determined.

2. The system of claim 1, wherein the controller is configured to direct the propulsion-generating vehicles to operate at respective fueling levels that generate the respective power outputs.

3. The system of claim 1, wherein the controller is configured to determine which propulsion-generating vehicle or vehicles in the group of propulsion-generating vehicles are at increased risk by determining which propulsion-generating vehicle or vehicles in the group of propulsion-generating vehicles have an exhaust gas recirculation system.

4. The system of claim 1, wherein the controller is configured to determine which propulsion-generating vehicle or vehicles in the group of propulsion-generating vehicles are at increased risk by determining which propulsion-generating vehicle or vehicles in the group of propulsion-generating vehicles have an exhaust gas aftertreatment system.

5. The system of claim 1, wherein the controller is configured to determine which propulsion-generating vehicle or vehicles in the group of propulsion-generating vehicles have the increased risk based on which of the propulsion-generating vehicles in the group have a greater probability of the oil carryover after operating at the idle setting for at least the designated oil carryover commencement time period relative to one or more other propulsion-generating vehicles in the group.

6. The system of claim 1, wherein the controller is configured to determine the power outputs for the propulsion-generating vehicles in the group by determining the power outputs that the propulsion-generating vehicles in the group are to generate at one or more of different times during a trip of the group along one or more routes, different locations along the one or more routes, or different distances along the one or more routes.

7. The system of claim 1, wherein the energy management system is configured to determine the power requirement based on input received from an operator of a vehicle system that includes the group of propulsion-generating vehicles.

8. The system of claim 1, wherein the energy management system is configured to determine the power requirement based on designated operational settings of the propulsion-generating vehicles in the group that differ for one or more of different times during a trip of the group along one or more routes, different locations along the one or more routes, or different distances along the one or more routes.

9. The system of claim 1, wherein the controller is configured to determine which propulsion-generating vehicle or vehicles in the group of propulsion-generating vehicles are at increased risk: by determining which propulsion-generating vehicle or vehicles in the group of propulsion-generating vehicles have an exhaust gas recirculation system; by determining which propulsion-generating vehicle or vehicles in the group of propulsion-generating vehicles have an exhaust gas aftertreatment system; and based on which of the propulsion-generating vehicles in the group have a greater probability of the oil carryover after operating at the idle setting for at least the designated oil carryover commencement time period relative to one or more other propulsion-generating vehicles in the group.

10. The system of claim 1, wherein the controller is configured to direct the propulsion-generating vehicles to operate at respective fueling levels that generate the respective power outputs, and to determine the power outputs for the propulsion-generating vehicles in the group by determining the power outputs that the propulsion-generating vehicles in the group are to generate at one or more of different times during a trip of the group along one or more routes, different locations along the one or more routes, or different distances along the one or more routes.

11. The system of claim 1, wherein the energy management system is configured to determine the power requirement based on input received from an operator of a vehicle system that includes the group of propulsion-generating vehicles and based on designated operational settings of the propulsion-generating vehicles in the group that differ for one or more of different times during a trip of the vehicle system along one or more routes, different locations along the one or more routes, or different distances along the one or more routes.

12. A system comprising:
a controller configured to determine which propulsion-generating vehicle or vehicles in a group of propulsion-generating vehicles have an increased risk for oil carryover during operation at an idle setting for at least a designated oil carryover commencement time period, the controller determining which of the propulsion-generating vehicle or vehicles in the group of propulsion-generating vehicles are at the increased risk by determining which propulsion-generating vehicle or vehicles in the group of propulsion-generating vehicles have one or more of an exhaust gas recirculation system or an exhaust gas aftertreatment system; and
an energy management system configured to determine a power requirement for the group of propulsion-generating vehicles,
wherein the controller is configured to determine respective power outputs for the propulsion-generating vehicles in the group such that a combined power output generated by the group of propulsion-generating vehicles meets the power requirement that is determined and the propulsion-generating vehicle or vehicles having the increased risk for oil carryover do not operate at the idle setting for at least the designated oil carryover commencement time period, and
wherein the controller is configured to direct the propulsion-generating vehicles to operate at respective fueling levels that generate the respective power outputs.

13. The system of claim 12, wherein the controller is configured to determine which propulsion-generating vehicle or vehicles in the group of propulsion-generating vehicles have the increased risk based on which of the propulsion-generating vehicles in the group have a greater probability of the oil carryover after operating at the idle setting for at least the designated oil carryover commencement time period relative to one or more other propulsion-generating vehicles in the group.

14. The system of claim 12, wherein the controller is configured to determine the power outputs for the propulsion-generating vehicles in the group by determining the power outputs that the propulsion-generating vehicles in the group are to generate at one or more of different times during a trip of the group along one or more routes, different locations along the one or more routes, or different distances along the one or more routes.

15. The system of claim 12, wherein the energy management system is configured to determine the power requirement based on designated operational settings of the propulsion-generating vehicles in the group that differ for one or more of different times during a trip of the group along one or more routes, different locations along the one or more routes, or different distances along the one or more routes.

16. The system of claim 12, wherein the group of propulsion-generating vehicles comprises a group of locomotives.

17. The system of claim 16, wherein the controller is configured to determine which locomotive or locomotives in the group of locomotives have the increased risk based on which of the locomotives in the group have a greater probability of the oil carryover after operating at the idle setting for at least the designated oil carryover commencement time period relative to one or more other locomotives in the group.

18. The system of claim 16, wherein the controller is configured to determine the power outputs for the locomotives in the group by determining the power outputs that the locomotives in the group are to generate at one or more of different times during a trip of the group along one or more routes, different locations along the one or more routes, or different distances along the one or more routes.

19. The system of claim 16, wherein the energy management system is configured to determine the power requirement based on designated operational settings of the locomotives in the group that differ for one or more of different times during a trip of the group along one or more routes, different locations along the one or more routes, or different distances along the one or more routes.

20. A system comprising:
a controller configured to determine which locomotive or locomotives in a group of locomotives have an increased risk for oil carryover during operation at an idle setting for at least a designated oil carryover commencement time period; and
an energy management system configured to determine a power requirement for the group of locomotives, wherein the controller is configured to determine respective power outputs for the locomotives in the group such that the locomotive or locomotives having the increased risk for oil carryover do not operate at the idle setting for longer than the designated oil carryover commencement time period, and that a combined power output generated by the group of locomotives meets the power requirement that is determined.

* * * * *